United States Patent
Blumenthal

(10) Patent No.: US 6,653,249 B1
(45) Date of Patent: Nov. 25, 2003

(54) EMBLEM HAVING CALENDERED FABRIC LAYER

(75) Inventor: Robert Blumenthal, Philadelphia, PA (US)

(73) Assignee: Penn Emblem Corporation, Philadelphia, PA (US)

(*) Notice: Subject to any disclaimer, the term of this patent is extended or adjusted under 35 U.S.C. 154(b) by 0 days.

(21) Appl. No.: 09/579,171

(22) Filed: May 25, 2000

(51) Int. Cl.⁷ .................. B32B 9/00; D03D 19/00
(52) U.S. Cl. ............... 442/59; 428/334; 428/354; 428/355; 428/81
(58) Field of Search .................. 428/334, 354, 428/355, 81, 102, 193, 913.3

(56) References Cited

U.S. PATENT DOCUMENTS

| | | | |
|---|---|---|---|
| 2,825,117 A | | 3/1958 | Evans et al. |
| 2,905,999 A | | 9/1959 | Parker et al. |
| 3,657,060 A | * | 4/1972 | Haigh .................. 161/73 |
| 3,816,211 A | | 6/1974 | Haigh |
| 4,084,026 A | | 4/1978 | Gandia |
| 4,223,054 A | | 9/1980 | Schramer et al. |
| 4,262,397 A | | 4/1981 | Cecere |
| 4,415,617 A | | 11/1983 | D'Elia |
| 4,981,742 A | * | 1/1991 | Haigh .................. 428/64 |
| 5,817,393 A | | 10/1998 | Stahl |
| 5,895,505 A | * | 4/1999 | Yamamoto et al. .......... 8/471 |
| 5,902,667 A | | 5/1999 | Stahl |
| 5,914,173 A | | 6/1999 | Fishel et al. |
| 2001/0051483 A1 | | 12/2001 | Callaway et al. .......... 424/314 |

OTHER PUBLICATIONS

Marjory L. Joseph, "Introductory Textile Science Fifth Edition", CBS College Publishing, (pp. 341,348,349).*

* cited by examiner

*Primary Examiner*—Terrel Morris
*Assistant Examiner*—Alexis Wachtel
(74) *Attorney, Agent, or Firm*—Akin Gump Strauss Hauer & Feld, L.L.P.

(57) ABSTRACT

An emblem comprises a first layer of fabric which has been deformed by a calendering process including the application of heat and pressure. A pattern is formed on the first surface of the fabric layer and a second layer of thermoplastic adhesive material is bonded to a second surface of the fabric layer. The application of the calendering process to the fabric layer compresses and deforms the fibers of the fabric to provide a flat, even surface with high luster.

10 Claims, 1 Drawing Sheet

EMBLEM HAVING CALENDERED FABRIC LAYER

BACKGROUND OF THE INVENTION

The present invention relates to an emblem and a method of making an emblem and, in particular, an emblem and a method of making an emblem from a fabric layer which has been deformed by a calendering process.

In general, emblems and methods for making emblems are well known in the art. A particular embroidered emblem and method of making the embroidered emblem is disclosed in U.S. Pat. Nos. 3,657,060 and 3,816,211 which are owned by the assignee of the present application. These two patents disclose an embroidered emblem which comprises a fabric base with an embroidered design on a first principal surface of the fabric base and a thermoplastic material laminated on the second principal surface of the fabric base. In this manner, the emblem can be conveniently fastened to a garment or other surface through the application of heat and pressure to melt the thermoplastic material and thereby bond the fabric base to the garment or other surface. A similar emblem and method is disclosed in U.S. Pat. No. 4,981,742. The subject matter of each of the three above-mentioned patents is hereby incorporated by reference into the present application.

While the emblems disclosed in the three above-mentioned patens are quite acceptable and while the methods disclosed in the.patents are quite useful in manufacturing such emblems, there is a need in the art for an emblem which provides an enhanced appearance as well as enhanced performance characteristics.

Calendering is a mechanical process which is generally well known in the fabric arts and is used to finish or impart certain special effects, such as high luster, glazing, moiré and embossing effects to existing fabrics. More particularly, calendering involves the application of pressure, either alone or in combination with heat, to an existing fabric to effectively compress the fibers of the fabric to produce the desired special effect. U.S. Pat. No. 4,262,397 discloses a method for calendering tubular knitted fabric to smooth and stabilize the fabric. U.S. Pat. No. 4,084,026 discloses a calendering process for embossing designs on fabrics used as blankets, bedspreads and the like. Although, the calendering process has been used in the fabric industry for creating certain special surface effects on fabrics, the calendering process has not been used to date in connection with the production of emblems. It has been found that by applying calendering to the base fabric used in making emblems, the resulting emblem includes a high luster which enhances the appearance of the emblem. In addition, calendering the base fabric improves the performance of some emblems. For example, with emblems in which the pattern is sublimated, the color of the sublimated ink is retained longer and in better condition with a calendered fabric base. With respect to a screen printed emblem, the printing holds up better to repeated industrial laundering if the fabric base is subjected to a calendering process.

BRIEF SUMMARY OF THE INVENTION

Briefly stated, the present invention comprises an emblem formed of a first layer of fabric, which has been deformed by a calendering process comprising the application of heat and pressure. The emblem further includes a pattern on a first surface of the fabric layer and a second layer of thermoplastic adhesive material bonded to a second surface of the fabric layer.

The present invention also comprises a method of making an emblem, including the steps of providing a fabric layer; subjecting the fabric layer to a calendering process comprising the application of heat and pressure; applying a pattern on the first surface of the fabric layer; and bonding a second layer of thermoplastic adhesive material to a second surface of the fabric layer.

BRIEF DESCRIPTION OF THE SEVERAL VIEWS OF THE DRAWING

The foregoing summary, as well as the following detailed description of preferred embodiments of the invention will be better understood when read in conjunction with the appended drawing. For the purpose of illustrating the invention, there are shown in the drawing, embodiments which are presently preferred. It should be understood, however, that the present invention is not limited to the precise arrangements and instrumentalities shown. In the drawing.

DETAILED DESCRIPTION OF THE INVENTION

As described above, the present invention comprises an emblem of the type which includes a base formed of a first layer of fabric. Emblems in accordance with the present invention are substantially the same as existing, prior art emblems with one notable exception. That exception is that the fabric layer, which is employed for producing emblems in accordance with the present invention is initially subjected to a calendering process prior to the production of the emblem. The calendering process provides a desirable surface effect to the fabric layer which results in an emblem with an enhanced appearance once the emblem making process has been completed. In addition, subjecting the fabric to a calendering process results in emblems which exhibit enhanced performance characteristics including the enhanced ability to maintain color and/or print quality despite the emblems being subjected to industrial laundering.

Figure 1:
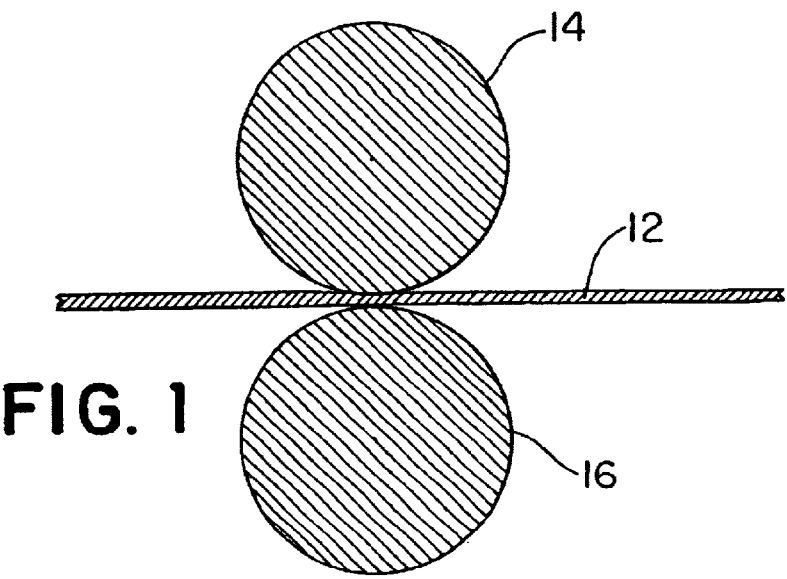
FIG. 1 is a schematic representation of the application of a calendering process to a base fabric used in producing an emblem.

Referring the drawing, wherein the same reference numerals are used to indicate the same components throughout the several figures, there is shown in FIG. 1 a schematic representation of a calendering process being applied to a fabric 12 in accordance with the present invention. Preferably, the fabric 12 is a woven textile fabric which may be made from any type of natural or synthetic textile material using techniques which are well known to those skilled in the art. More preferably, the fabric 12 is a woven polyester, woven cotton or a combination thereof. Presently preferred fabrics include, 100% polyester, 100% cotton or polyester-cotton blends of about 65% polyester and about 35% cotton. It will be appreciated by those of ordinary skill in the art that while certain fabrics as described above are preferred, virtually any suitable woven fabric may be employed. If desired, the fabric 12 may be coated or impregnated with one or more soil resisting or stain repellent treatments. In addition, the fabric 12 may be colored using textile dyes of a type well known to those of ordinary skill in the art.

As illustrated schematically in FIG. 1, the calendering process involves the application of pressure and heat to the fabric layer 12. In particular, a pair of rollers 14, 16 are employed for applying the pressure and heat to the fabric layer 12. Preferably, the rollers 14, 16 are made of a high strength material such as steel and are arranged to apply the desired amount of pressure and/or heat to the fabric layer 12. Preferably, the pressure which is applied to the fabric layer 12 is in the range of 300 to 450 lbs. per linear inch and, more preferably, is in the range of 375 to 425 lbs. per linear inch. At least one of the rollers, preferably the upper roller 14 is heated to the desired temperature to simultaneously apply heat to the fabric layer 12. In the present embodiment, the desired temperature is in the range of 370° to 420° F. and more preferably is in the range of 390° to 400° F. The manner in which the rollers 14, 16 are constructed, the techniques employed for causing the rollers 14, 16 to rotate and the manner in which the upper roller 14 is heated are well known to those of ordinary skill in the calendering art and need not be described herein for a complete understanding of the present invention. The application of heat and pressure by the rollers 14, 16 results in the fabric layer 12 being compressed and deformed to a flat, generally even surface with a high luster. The heat and pressure which is applied to the fabric 12 is sufficient so that the fabric 12 does not fully recover and, therefore, retains the flat, generally even surface, high luster features. If desired, the lower roller 16 may be unheated or may be heated to a lower temperature than the temperature to which the upper roller 14 is heated. The combination of the application of heat and pressure causes individual fibers within the fabric to melt and flow, such that the fibers are flattened and the surface facing the heated roller 14 is left with a high luster.

Figure 2:
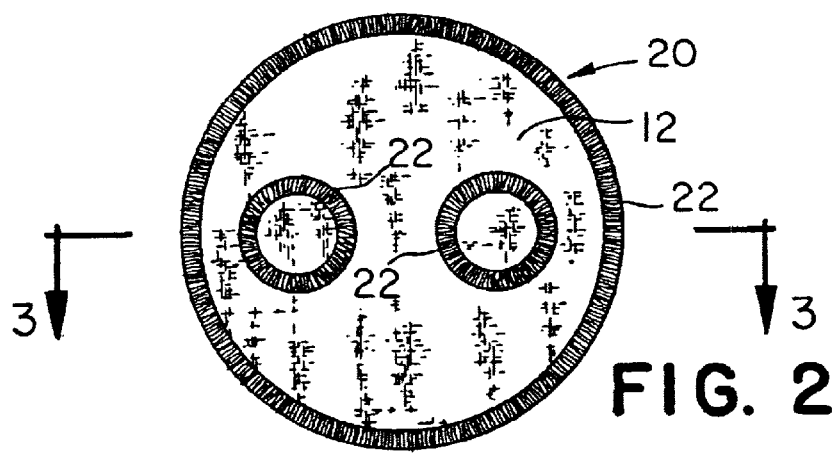
FIG. 2 is a top plan view of an embroidered emblem in accordance with a first preferred embodiment of the present invention.
Figures 3, 4:
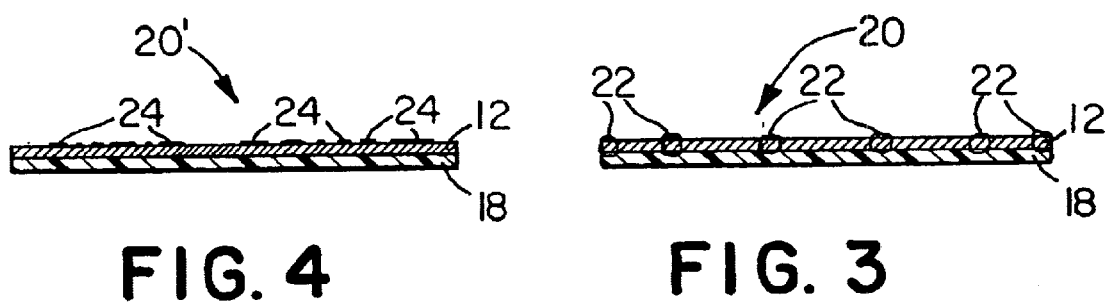
FIG. 3 is a sectional view taken along line 3—3 of FIG. 2.
FIG. 4 is a sectional view of a second preferred embodiment of an nonembroidered emblem in accordance with the present invention.

Once the calendering process has been completed the resulting flattened high luster fabric 12 is employed for completion of the emblem making process in a manner as described in connection with the above-referenced patents. FIGS. 2 and 3 illustrate a first embodiment of an embroidered emblem 20 made in accordance with the present invention. An emblem pattern 22 is embroidered to the fabric layer 12 using techniques which are well known to those of ordinary skill in the art as described in the above-referenced patents. In the illustrated embodiment, the embroidered pattern 22 comprises a pair of circles surrounded by a border. It should be understood by those of ordinary skill in the art that the particular embroidered pattern 22 is provided only for purposes of illustration and should not be considered to be a limitation on the present invention, which could employ any type of embroidered pattern. Preferably, the embroidered pattern 22 is applied to the first or upper surface of the fabric layer 12, which preferably is the surface which has been exposed to the heated roller 14 and, therefore, has the high luster appearance.

Once the embroidered pattern 22 has been applied to the first surface of the fabric layer 12, a second layer of thermoplastic adhesive material 18 is bonded to the second surface of the fabric layer 12. Preferably, the thermoplastic adhesive material comprises a polyurethane of a type well known to those of ordinary skill in the art and as described in the above-identified patents. The thermoplastic adhesive layer 18 facilitates the convenient application of the emblem 20' to a garment or other surface through the application of heat and pressure in a manner well known to those of ordinary skill in the art.

FIG. 4 illustrates an alternate embodiment of the present invention. In the embodiment 20 illustrated in FIG. 4, the pattern 24 is not applied to the first surface of the fabric layer 12 by embroidering. Instead, the pattern 24 is applied to the first surface of the fabric layer 12 using some other technique well known to those of ordinary skill in the art. For example, the pattern 24 may be sublimated or may be screen printed to the first surface of the fabric layer 12. Other techniques for the application of the pattern 24 to the first surface of the fabric layer 12 will be apparent to those of ordinary skill in the art. As with the emblem 20 of FIGS. 2 and 3, the layer of thermoplastic adhesive material 18 bonded to the second surface of the fabric layer 12.

From the foregoing, it will be appreciated that the present invention comprises an improved emblem which includes a base fabric with a high luster surface. The present emblem is made by first applying a calendering process to the base fabric from which the emblem is formed. It will be appreciated by those of ordinary skill in the art that changes or modifications may be made to the embodiments described above. For example, the thermoplastic adhesive material 18 may be applied to the second surface of the fabric layer 12 before the pattern 22 is applied. Therefore, the present invention is not limited to the particular embodiments described but may be embodied in other specific forms within a spirit and scope of the appended claims.

What is claimed is:

1. An emblem comprising:
   a first layer of fabric which has been deformed by a calendering process comprising the application of heat and pressure;
   a pattern on a first surface of the fabric layer; and
   a second layer of thermoplastic adhesive material bonded to a second surface of the fabric layer.

2. The emblem as recited in claim 1 wherein the fabric is a woven fabric selected from the group consisting of polyester, cotton and combinations thereof.

3. The emblem as recited in claim 1 wherein the second layer comprises a polyurethane.

4. The emblem as recited in claim 1 wherein the pattern is embroidered.

5. The emblem as recited in claim 1 wherein the pattern is sublimated.

6. The emblem as recited in claim 1 wherein the pattern is screen printed.

7. The emblem as recited in claim 1 wherein the fabric layer is deformed by the application of pressure in the range of 300–450 lbs. per linear inch.

8. The emblem as recited in claim 1 wherein the fabric layer is deformed by the application of heat in the range of 370–420° F.

9. The emblem as recited in claim 1 wherein the fabric layer includes fibers which are flattened.

10. The emblem as recited in claim 1 wherein the first surface of the fabric layer includes a luster.

* * * * *